(12) United States Patent
Nakagawa et al.

(10) Patent No.: US 10,293,858 B2
(45) Date of Patent: May 21, 2019

(54) VEHICLE SUBSTRUCTURE

(71) Applicant: TOYOTA JIDOSHA KABUSHIKI KAISHA, Toyota-shi, Aichi-ken (JP)

(72) Inventors: Yukio Nakagawa, Toyota (JP); Koichi Fukui, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/807,624

(22) Filed: Nov. 9, 2017

(65) Prior Publication Data

US 2018/0148100 A1 May 31, 2018

(30) Foreign Application Priority Data

Nov. 29, 2016 (JP) ................................. 2016-231500

(51) Int. Cl.
*B60N 99/00* (2006.01)
*B62D 21/15* (2006.01)
*B62D 35/02* (2006.01)

(52) U.S. Cl.
CPC ........... *B62D 21/155* (2013.01); *B62D 35/02* (2013.01); *Y02T 10/82* (2013.01); *Y02T 10/88* (2013.01)

(58) Field of Classification Search
CPC ....... B62D 21/155; B62D 35/02; Y02T 10/82; Y02T 10/88
See application file for complete search history.

(56) References Cited

U.S. PATENT DOCUMENTS

| 10,124,838 B2* | 11/2018 | Shibutake | ............ B62D 35/005 |
| 2016/0052555 A1* | 2/2016 | Abe | ..................... B60R 13/0861 |
| | | | 296/187.08 |
| 2017/0174272 A1* | 6/2017 | Yonezawa | .............. B62D 25/20 |

FOREIGN PATENT DOCUMENTS

| JP | 2008-247120 | | 10/2008 | |
| JP | 2015054588 A | * | 3/2015 | ............. B62D 35/02 |
| JP | 2016137824 A | * | 8/2016 | |
| WO | WO-2011114509 A1 | * | 9/2011 | ............. B62D 35/02 |

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle substructure includes a first undercover disposed in a lower portion of a vehicle and a second undercover disposed side by side with the first undercover in the lower portion of the vehicle. The second undercover is fastened to a skeleton member of the vehicle via a fastening bolt inserted into a bolt hole provided in the second undercover. A part of the first undercover is disposed below the second undercover to cover the fastening bolt fastening the second undercover from below the vehicle.

6 Claims, 7 Drawing Sheets

VEHICLE SUBSTRUCTURE

INCORPORATION BY REFERENCE

The disclosure of Japanese Patent Application No. 2016-231500 filed on Nov. 29, 2016 including the specification, drawings and abstract is incorporated herein by reference in its entirety.

BACKGROUND

1. Technical Field

The disclosure relates to a vehicle substructure.

2. Description of Related Art

Japanese Unexamined Patent Application Publication No. 2008-247120 (JP 2008-247120 A) discloses a substructure of a vehicle that has a lower portion in which an undercover is disposed. The undercover includes a front portion undercover and a rear portion undercover that are disposed side by side in the front-rear direction of the vehicle. Bolt holes are formed in the front portion undercover and the rear portion undercover. Each of the undercovers is fastened to a front subframe, which is a skeleton member of the vehicle, by a fastening bolt that is inserted into the bolt hole from below the vehicle.

SUMMARY

In some cases, road surface unevenness causes unintended contact between a road surface and members disposed in the lower portion of the vehicle during traveling of the vehicle. Accordingly, the vehicle substructure that is disclosed in JP 2008-247120 A causes contact between a road surface and the bolt disposed in the lower portion of the vehicle in some cases.

An aspect relates to a vehicle substructure including a first undercover disposed in a lower portion of a vehicle and a second undercover disposed side by side with the first undercover in the lower portion of the vehicle. The second undercover is fastened to a skeleton member of the vehicle via a fastening bolt inserted into a bolt hole provided in the second undercover. A part of the first undercover is disposed below the second undercover to cover the fastening bolt fastening the second undercover from below the vehicle.

According to the aspect, the fastening bolt fastening the second undercover is covered from below the vehicle by the first undercover. Accordingly, with the above-described configuration, the fastening bolt covered by the first undercover is not exposed downward of the vehicle and contact between the fastening bolt and a road surface can be suppressed during traveling of the vehicle. As a result, the fastening reliability of the fastening bolt can be ensured.

In the vehicle substructure according to the aspect, the second undercover may include a middle portion disposed at a middle part of the vehicle in a width direction of the vehicle and a side portion extending outward in the width direction of the vehicle from the middle portion. The middle portion may be disposed below the side portion and the fastening bolt covered from below the vehicle by the part of the first undercover may be arranged in the middle portion.

In some cases, the middle part of the vehicle in the width direction of the vehicle is disposed at a position closer to the road surface than both end parts of the vehicle in the width direction of the vehicle for mounting of driving components and so on. In this case, the middle portion of the second undercover disposed at the middle part of the vehicle in the width direction of the vehicle is disposed below the side portion extending outward in the width direction of the vehicle from the middle portion. According to the aspect, the fastening bolt fastening the middle portion to the skeleton member of the vehicle is covered by the first undercover. Therefore, contact between the road surface and the fastening bolt which is disposed at a part of the lower portion of the vehicle which is more likely to come into contact with the road surface can be suppressed. Therefore, the fastening reliability of the fastening bolt is ensured and the configuration aspect of the first undercover becomes appropriate.

In the vehicle substructure according to the aspect, the first undercover and the second undercover are disposed side by side in a front-rear direction of the vehicle such that the first undercover is positioned in front of the second undercover.

According to the aspect, the part of the first undercover is disposed on the front side of the vehicle to be disposed below the second undercover disposed on a rear side of the vehicle and therefore, covers the fastening bolt fastening the second underfloor from below the vehicle. Accordingly, the undercover is unlikely to be caught by the road surface during a forward movement of the vehicle.

In the vehicle substructure according to the aspect, the first undercover may be obliquely disposed with respect to a horizontal direction such that the first undercover is positioned to be higher the closer the first undercover is to the front side of the vehicle. A rear end portion of the first undercover may cover a front end portion of the middle portion of the second undercover and a front end portion of the side portion of the second undercover from below the vehicle by extension of the rear end portion of the first undercover covering a space below each of the front end portions of the second undercover from below the vehicle.

According to the aspect, the gap between the first undercover and the road surface is wider on the front side of the vehicle. Accordingly, the first undercover is unlikely to come into contact with the road surface. Even if the first undercover comes into contact with the road surface during the forward movement of the vehicle, the boundary part that is shared by the first undercover and the second undercover is unlikely to be caught by the road surface. This is because the rear end portion of the first undercover is disposed below each of the front end portions of the second undercover. In addition, the turbulence of the air that flows from the front of the vehicle to the rear of the vehicle can be suppressed. Therefore, the above-described configuration is capable of contributing to improving the durability of the undercover and suppressing an increase in air resistance.

In the vehicle substructure according to the aspect, a through-hole is provided at a position in the rear end portion of the first undercover, the position corresponding to the fastening bolt arranged in the front end portion of the side portion.

According to the aspect, the fastening bolt arranged in the front end portion of the second undercover is covered by the first undercover in the middle portion of the second undercover disposed at a position close to the road surface. In the side portion of the second undercover more distant from the road surface and less likely to come into contact with the road surface than the middle portion, the fastening bolt arranged in the front end portion of the second undercover is in a state where the fastening bolt arranged in the front end portion of the second undercover is not covered by the first undercover because of the through-hole formed at the position in the first undercover corresponding to the fastening bolt. Accordingly, access to the fastening bolt can be given through the through-hole, and the fastening bolt fastening the side portion of the second undercover is removed with ease even in a state where the first undercover is assembled in the vehicle. Therefore, with the above-described configuration, contact between the fastening bolt and the road surface can be suppressed and the fastening bolt can be removed with ease at the same time.

In the vehicle substructure according to the aspect, the first undercover has a recessed groove, the recessed groove extending from a peripheral edge of the first undercover to a part of the first undercover which covers the fastening bolt arranged in the front end portion of the middle portion and the recessed groove being recessed downward. The recessed groove has a depth allowing a tool for the fastening bolt to be disposed between the first undercover and the second undercover.

According to the aspect, the fastening bolt fastening the middle portion of the second undercover can be removed by insertion of the tool for the fastening bolt into the recessed groove from the peripheral edge of the first undercover even in a state where the first undercover and the second undercover are assembled in the vehicle, that is, a state where the fastening bolt fastening the middle portion of the second undercover is covered by the first undercover. Accordingly, the second undercover can be removed when the first undercover is assembled in the vehicle. As a result, a contribution can be made to improving the maintainability of the vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of a vehicle substructure will be described below with reference to FIGS. 1 to 8. In each of the drawings, the front of a vehicle will be referred to as "Fr", the rear of the vehicle will be referred to as "Rr", the side that is to the right of the front of the vehicle when the vehicle is seen from below will be referred to as "RH", the side that is to the left of the front of the vehicle when the vehicle is seen from below will be referred to as "LH", and the top of the vehicle will be referred to as "Upr". Each of "Fr", "Rr", "RH", "LH", and "Upr" will be indicated by the direction of an arrow.

Figure 1:
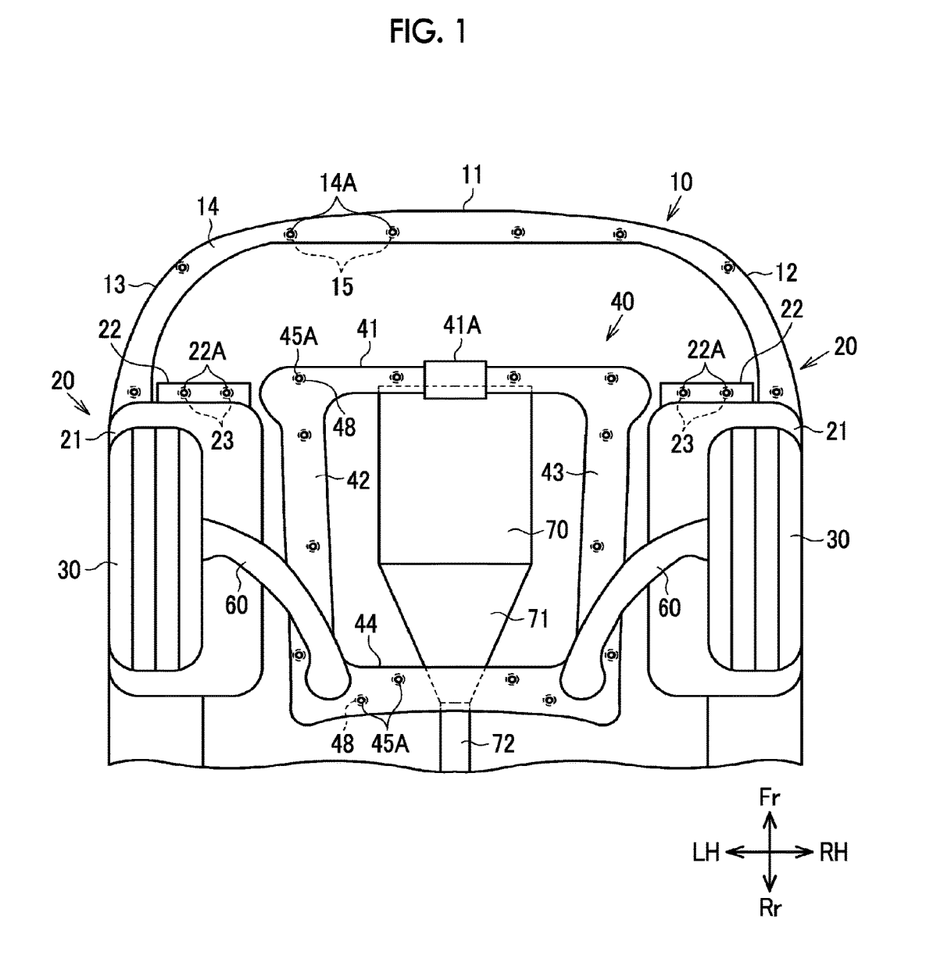
FIG. 1 is a bottom view schematically illustrating the configuration of a vehicle substructure in the front end portion of a vehicle in a state where an undercover is removed therefrom.

As illustrated in FIG. 1, a front bumper 10 is disposed in the front end portion of the vehicle. The front bumper 10 has a flat plate portion 11, a right curved portion 12, and a left curved portion 13. The flat plate portion 11 extends in the width direction of the vehicle. The right curved portion 12 extends in a curved shape from the right end of the flat plate portion 11 to the rear of the vehicle. The left curved portion 13 extends in a curved shape from the left end of the flat plate portion 11 to the rear of the vehicle. A first mounting flange 14 is connected to the lower end portions of the flat plate portion 11, the right curved portion 12, and the left curved portion 13. A plurality of bolt holes 14A is formed in the first mounting flange 14. Nuts 15 are disposed and welded on the upper surface of the first mounting flange 14. The nuts 15 fit with the respective bolt holes 14A. The screw holes that are formed in the nuts 15 and the bolt holes 14A are disposed on the same axis and communicate with each other.

The vehicle has a pair of wheelhouses 20 as skeleton members disposed in both end portions in the width direction of the vehicle. Front tires 30 are accommodated in the respective wheelhouses 20. Each of the wheelhouses 20 has a liner portion 21 and a second mounting flange 22. The liner portion 21 extends in a curved shape along the outer peripheral surface of the front tire 30. The second mounting flange 22 is connected to the front end portion of the liner portion 21. A plurality of bolt holes 22A is formed in the second mounting flange 22. The bolt holes 22A are disposed side by side in the width direction of the vehicle. Nuts 23 are disposed and welded on the upper surface of the second mounting flange 22. The nuts 23 fit with the respective bolt holes 22A. The screw holes that are formed in the nuts 23 and the bolt holes 22A are disposed on the same axis and communicate with each other.

A subframe 40 as a skeleton member is also disposed in the vehicle. The subframe 40 is disposed between the wheelhouses 20. The subframe 40 is formed in the shape of a quadrangular frame when the subframe 40 is seen from below the vehicle. In other words, the subframe 40 has a front cross member 41 disposed on the front side of the vehicle and extending in the width direction of the vehicle. A left frame member 42 extending in the front-rear direction of the vehicle is connected to the left end portion of the front cross member 41. A right frame member 43 extending in the front-rear direction of the vehicle is connected to the right end portion of the front cross member 41. The rear end portion of the left frame member 42 and the rear end portion of the right frame member 43 are connected to each other by a rear cross member 44 extending in the width direction of the vehicle.

Figure 2:
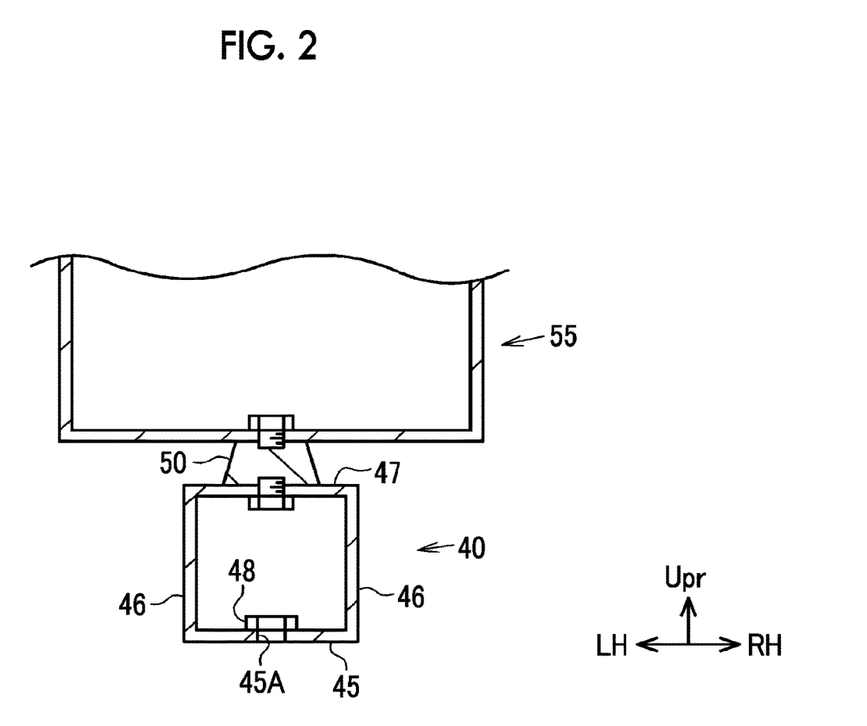
FIG. 2 is a sectional view illustrating an aspect of connection between a subframe and a front side member.

As illustrated in FIG. 2, the subframe 40 has a lower wall 45, a pair of side walls 46, and an upper wall 47. The side walls 46 stand from both end portions of the lower wall 45. The upper wall 47 connects the upper end portions of the side walls 46 to each other. The subframe 40 is formed such that the subframe 40 has the sectional shape of a quadrangular frame. In other words, the subframe 40 is a closed sectional structure. A plurality of bolt holes 45A is formed in the lower wall 45 of the subframe 40. Nuts 48 are disposed and welded on the upper surface of the lower wall 45 of the subframe 40. The nuts 48 fit with the respective bolt holes 45A. The nuts 48 are accommodated in the inner portion of the subframe 40. The screw holes that are formed in the nuts 48 and the bolt holes 45A are disposed on the same axis and communicate with each other. A mount member 50 is arranged above the subframe 40. The mount member 50 is made of an elastic material such as rubber. The mount member 50 has the shape of a truncated cone and its diameter is larger on the bottom side of the vehicle. The lower end portion of the mount member 50 is bolted to the upper wall 47 of the subframe 40. The upper end face of the mount member 50 abuts against the lower surface of a front side member 55. The upper end face of the mount member 50 and the lower surface of the front side member 55 are bolted to each other. In this manner, the subframe 40 is connected to the lower surface of the front side member 55 via the mount member 50. As illustrated in FIG. 1, the front cross member 41 of the subframe 40 has a mounting portion 41A for jack attachment at the middle part of the subframe 40 in the width direction of the vehicle. The mounting portion 41A is thicker and more rigid than the rest of the front cross member 41. The bolt holes 45A that are formed in the front cross member 41 are disposed in front of the bolt holes 22A that are formed in the second mounting flanges 22 of the wheelhouses 20.

As illustrated in FIG. 1, a pair of arms 60 is assembled in the subframe 40. The arms 60 are connected to the respective front tires 30. The arms 60 have an arc shape when the arms 60 are seen from below the vehicle. The arms 60 are component members constituting a suspension. The arms 60 provide independent suspension for the right and left front tires 30.

An internal combustion engine 70 is mounted in the vehicle. The internal combustion engine 70 is assembled in the upper end portion of the subframe 40 via an engine mount (not illustrated). The internal combustion engine 70 is disposed at the middle part of the vehicle in the width direction of the vehicle. A transmission 71 is connected to the rear end of the internal combustion engine 70. A propeller shaft 72 extending in the front-rear direction of the vehicle is connected to the transmission 71. The driving force of the internal combustion engine 70 is transmitted to the propeller shaft 72 via the transmission 71. Then, the driving force is transmitted to the rear tires of the vehicle. In other words, the internal combustion engine 70, the transmission 71, and the propeller shaft 72 correspond to driving components driving the vehicle.

Figure 3:
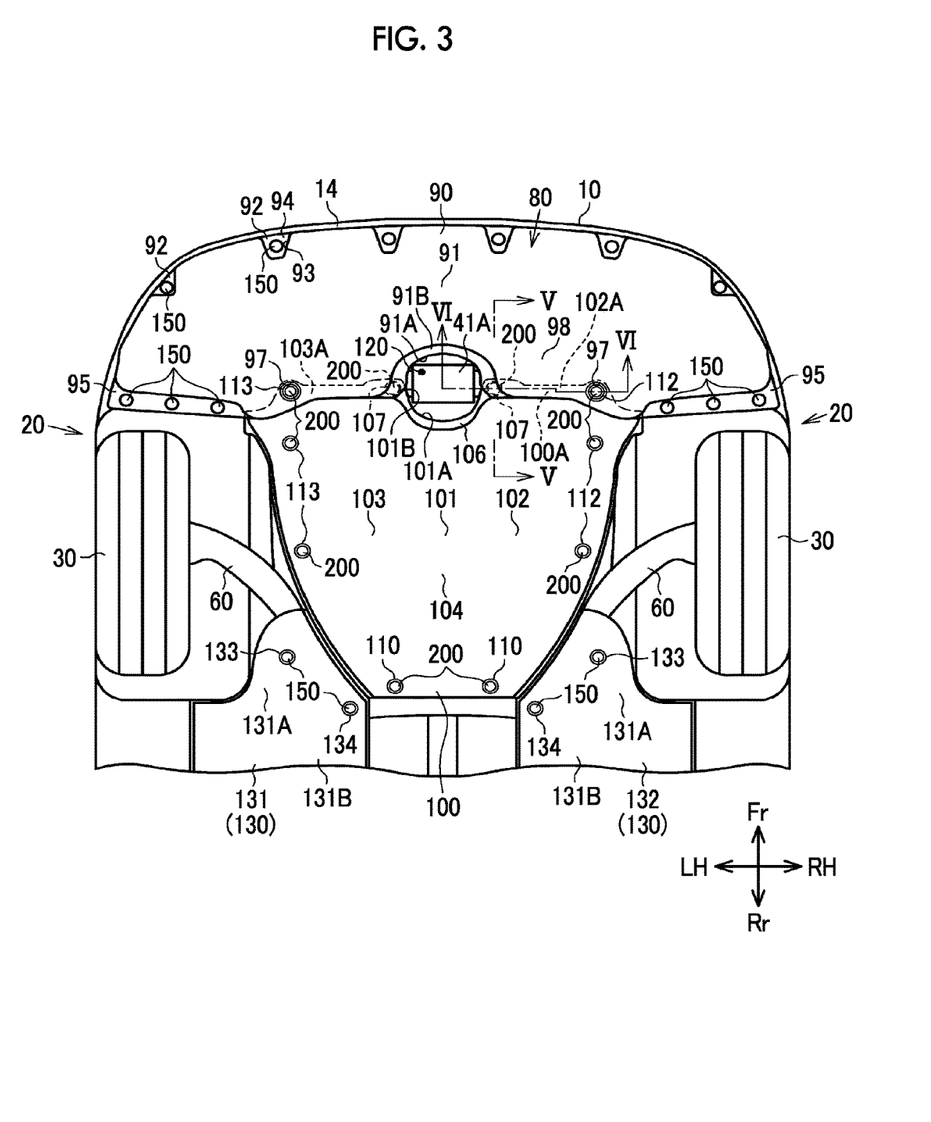
FIG. 3 is a bottom view schematically illustrating the configuration of the substructure in the front end portion of the vehicle in a state where the undercover is attached thereto.

As illustrated in FIG. 3, the vehicle substructure has an undercover 80 protecting each component of the vehicle by covering it from below the vehicle. A resinous plate material or the like constitutes the undercover 80. The undercover 80 is disposed in the lower portion of the vehicle. The undercover 80 has a front undercover 90 and a middle undercover 100. The front undercover 90 is disposed in the front end portion of the vehicle. The middle undercover 100 is disposed behind and side by side with the front undercover 90. The front undercover 90 has a protective plate portion 91 extending from a first end of the vehicle in the width direction of the vehicle to a second end of the vehicle in the width direction of the vehicle. The protective plate portion 91 is formed such that the peripheral edge portion of the protective plate portion 91 on the front side of the vehicle is curved in a shape that fits with the shape of the front bumper 10. A plurality of recessed portions 92 is disposed in the peripheral edge portion of the protective plate portion 91 on the front side of the vehicle. The recessed portions 92 are arranged to fit with the positions of the respective bolt holes 14A formed in the first mounting flange 14.

Figure 4:
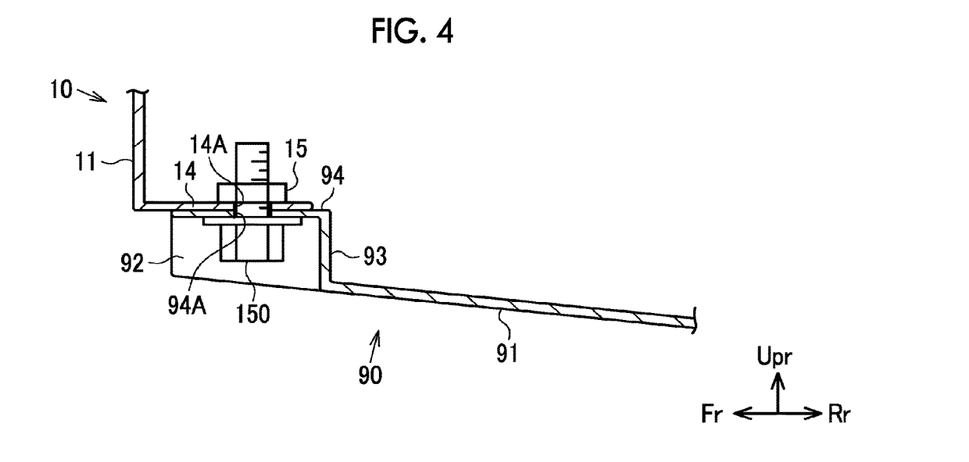
FIG. 4 is a sectional view illustrating an aspect of fastening of a front undercover and a front bumper.

As illustrated in FIG. 4, each of the recessed portions 92 has a standing wall 93 and an abutting wall 94. The standing wall 93 extends upward from the protective plate portion 91. The abutting wall 94 extends forward from the upper end of the standing wall 93. The recessed portion 92 is shaped such that it is recessed upward from the protective plate portion 91. The upper surface of the abutting wall 94 of the recessed portion 92 abuts against the lower surface of the first mounting flange 14. A fastening hole 94A communicating with the bolt hole 14A formed in the first mounting flange 14 is formed in the abutting wall 94. A bolt 150 is inserted into the fastening hole 94A and the bolt hole 14A from below the vehicle. The bolt 150 is fastened to the nut 15 welded on the first mounting flange 14. The protective plate portion 91 is obliquely disposed with respect to the horizontal direction such that the protective plate portion 91 is positioned to be higher the closer the protective plate portion 91 is to the front side of the vehicle.

As illustrated in FIG. 3, the front undercover 90 also has a pair of fastening flanges 95 connected to the peripheral edge of the protective plate portion 91 on the rear side of the vehicle. The fastening flanges 95 are separated from each other in the width direction of the vehicle. The fastening flanges 95 are disposed in both end portions of the front undercover 90 in the width direction of the vehicle, respectively. Each of the fastening flanges 95 extends upward from the peripheral edge of the protective plate portion 91. The upper end portion of each of the fastening flanges 95 is bent rearward. In other words, each of the fastening flanges 95 has an L-shaped cross section. The upper surface of the fastening flange 95 abuts against the lower surface of the first mounting flange 14 and the lower surface of the second mounting flange 22 of the wheelhouse 20. A plurality of fastening holes is formed in the fastening flange 95. The fastening holes are formed side by side in the width direction of the vehicle to fit with the positions of the bolt holes 14A formed in the first mounting flange 14 and the bolt holes 22A formed in the second mounting flange 22. The bolts 150 are inserted into the fastening holes and the bolt holes 14A, 22A from below the vehicle. Each of the bolts 150 is fastened to the nut 15 welded on the first mounting flange 14 or the nut 23 welded on the second mounting flange 22. In this manner, the front undercover 90 is bolted to the front bumper 10 and the wheelhouse 20.

A first notched hole 91A is formed at the middle part of the protective plate portion 91 in the width direction of the vehicle. The first notched hole 91A is shaped such that it is notched from the peripheral edge on the rear side of the vehicle. The first notched hole 91A has a semicircular shape. The first notched hole 91A is disposed below the mounting portion 41A of the front cross member 41. In the rear end portion of the protective plate portion 91, a peripheral edge portion 91B constituting the first notched hole 91A extends obliquely upward. In the following description, the rear side part that includes the first notched hole 91A will be referred to as a rear end portion 98 of the front undercover.

The middle undercover 100 is disposed between the wheelhouses 20 and covers the subframe 40 from below the vehicle. The middle undercover 100 has a middle portion 101, a right side portion 102, and a left side portion 103. The middle portion 101 is disposed at the middle part of the vehicle in the width direction of the vehicle. The right side portion 102 extends to the right side in the width direction of the vehicle from the middle portion 101. The left side portion 103 extends to the left side in the width direction of the vehicle from the middle portion 101. The middle portion 101 is disposed below the internal combustion engine 70, the transmission 71, and the propeller shaft 72. Accordingly, the middle portion 101 is disposed below the right side portion 102 and the left side portion 103 in which the driving components are not disposed. The middle portion 101 has a main body portion 104 extending in the front-rear direction of the vehicle.

Figure 5:
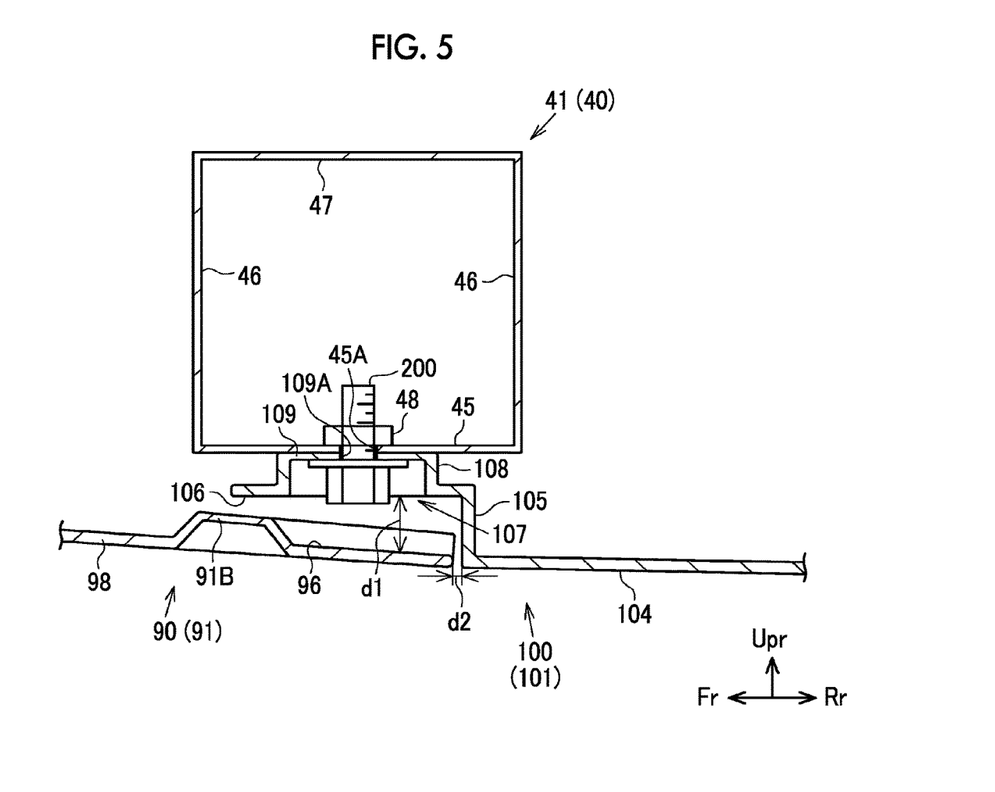
FIG. 5 is a cross-sectional view taken along line V-V of FIG. 3.

As illustrated in FIG. 5, an upward extending portion 105 and a forward extending portion 106 are disposed at the front end of the main body portion 104. The upward extending portion 105 extends upward from the main body portion 104. The forward extending portion 106 extends forward from the upper end of the upward extending portion 105. Dent portions 107 dented upward are formed in the forward extending portion 106. In other words, the dent portions 107 have cylindrical peripheral walls 108 extending upward from the forward extending portion 106 and lid walls 109 connecting the upper ends of the peripheral walls 108 to each other. The upper surface of the lid wall 109 abuts against the lower surface of the front cross member 41 of the subframe 40. As illustrated in FIG. 3, the two dent portions 107 are formed in the forward extending portion 106 to fit with the positions of the bolt holes 45A formed in the front cross member 41. As illustrated in FIG. 5, a fastening hole 109A communicating with the bolt hole 45A formed in the front cross member 41 is formed in the lid wall 109 of each of the dent portions 107. A fastening bolt 200 is inserted into the fastening hole 109A and the bolt hole 45A from below the vehicle. Each of the fastening bolts 200 is fastened to the nut 48 welded on the front cross member 41. As illustrated in FIG. 3, two dent portions 110 are disposed, side by side in the width direction of the vehicle, in the rear end portion of the main body portion 104. The two dent portions 110 have the same configuration as the dent portions 107 formed in the forward extending portion 106. The upper surface of the dent portion 110 abuts against the lower surface of the rear cross member 44 of the subframe 40. A fastening hole communicating with the bolt hole 45A formed in the rear cross member 44 is formed in the dent portion 110. The fastening bolt 200 is inserted into the fastening hole and the bolt hole 45A from below the vehicle. Each of the fastening bolts 200 is fastened to the nut 48 welded on the rear cross member 44.

As illustrated in FIG. 3, a second notched hole 101A is formed at the middle part of the middle portion 101 in the width direction of the vehicle. The second notched hole 101A is shaped such that it is notched from the peripheral edge on the front side of the vehicle. The second notched hole 101A has a semicircular shape. The second notched hole 101A is made up of the upward extending portion 105 and the forward extending portion 106. In other words, the upward extending portion 105 and the forward extending portion 106 constitute the second notched hole 101A and correspond to the peripheral edge portion that is recessed upward from the main body portion 104. The second notched hole 101A is disposed below the mounting portion 41A of the front cross member 41. The peripheral edge portion 91B constituting the first notched hole 91A of the front undercover 90 is disposed below the forward extending portion 106 constituting the first notched hole 91A of the middle undercover 100. The first notched hole 91A and the second notched hole 101A communicate with each other and constitute a jack hole 120 that has a circular shape. The jack hole 120 causes the mounting portion 41A of the front cross member 41 to be exposed downward.

The right side portion 102 extends less from the middle portion 101 on the rear side of the vehicle. The right side portion 102 has a substantially triangular shape when the right side portion 102 is seen from below the vehicle. A front end portion 102A of the right side portion 102 is bent upward. In addition, the right side portion 102 has an end portion bent forward. In other words, the front end portion 102A of the right side portion 102 has an L-shaped cross section. A plurality of dent portions 112 is formed, side by side in the front-rear direction of the vehicle, in the right side portion 102. The dent portions 112 have the same configuration as the dent portions 107, 110 and are formed to fit with the positions of the bolt holes 45A formed in the front cross member 41 and the right frame member 43. A fastening hole communicating with the bolt hole 45A formed in the front cross member 41 and the right frame member 43 is formed in each of the dent portions 112. The fastening bolt 200 is inserted into the fastening hole and the bolt hole 45A from below the vehicle. Each of the fastening bolts 200 is fastened to the nut 48 welded on the front cross member 41 or the right frame member 43.

The left side portion 103 extends less from the middle portion 101 on the rear side of the vehicle. The left side portion 103 has a substantially triangular shape and is bilaterally symmetrical to the right side portion 102 when the left side portion 103 is seen from below the vehicle. A front end portion 103A of the left side portion 103 is bent upward. In addition, the left side portion 103 has an end portion bent forward. In other words, the front end portion 103A of the left side portion 103 has an L-shaped cross section. A plurality of dent portions 113 is formed, side by side in the front-rear direction of the vehicle, in the left side portion 103. The dent portions 113 have the same configuration as the dent portions 107, 110, 112 and are formed to fit with the positions of the bolt holes 45A formed in the front cross member 41 and the left frame member 42. A fastening hole communicating with the bolt hole 45A formed in the front cross member 41 and the left frame member 42 is formed in each of the dent portions 113. The fastening bolt 200 is inserted into the fastening hole and the bolt hole 45A from below the vehicle. Each of the fastening bolts 200 is fastened to the nut 48 welded on the front cross member 41 or the left frame member 42. In this manner, the middle undercover 100 is bolted to the subframe 40 as a skeleton member.

The undercover 80 also has a pair of rear undercovers 130 disposed behind the middle undercover 100. The rear undercovers 130 are divided into a left rear undercover 131 disposed on the left side in the width direction of the vehicle and a right rear undercover 132 disposed on the right side in the width direction of the vehicle. The left rear undercover 131 and the right rear undercover 132 are separated from each other in the width direction of the vehicle. The left rear undercover 131 and the right rear undercover 132 are bilaterally symmetrical to each other in configuration. Accordingly, in the following description, the configuration of the left rear undercover 131 will be described and description of the right rear undercover 132 will be omitted with the same reference numerals used to refer to the same components.

As illustrated in FIG. 3, the left rear undercover 131 extends in the front-rear direction of the vehicle and a front end portion 131A of the left rear undercover 131 is disposed between the wheelhouse 20 and the middle undercover 100. The front end portion 131A of the left rear undercover 131 is formed such that the inside peripheral edge of the front end portion 131A in the width direction of the vehicle is shaped along a side peripheral edge of the left side portion 103 of the middle undercover 100 and is disposed adjacent to the middle undercover 100. A rear end portion 131B of the left rear undercover 131 has the shape of a rectangular plate extending in the front-rear direction of the vehicle. A dent portion 133 is formed in the front end portion 131A of the left rear undercover 131 to fit with the position of the bolt hole 45A formed in the rear end portion of the left frame member 42. The dent portion 133 has the same configuration as the dent portion 107 and has a fastening hole communicating with the bolt hole 45A formed in the rear end portion of the left frame member 42. The bolt 150 is inserted into the fastening hole and the bolt hole 45A from below the vehicle. The bolt 150 is fastened to the nut 48 welded on the left frame member 42. A dent portion 134 is formed in the rear end portion 131B of the left rear undercover 131 to fit with the position of the bolt hole 45A formed in the rear cross member 44. The dent portion 134 has the same configuration as the dent portion 107 and has a fastening hole communicating with the bolt hole 45A formed in the rear end portion of the rear cross member 44. The bolt 150 is inserted into the fastening hole and the bolt hole 45A from below the vehicle. The bolt 150 is fastened to the nut 48 welded on the rear cross member 44. In this manner, the front end portion 131A and the rear end portion 131B of the left rear undercover 131 are bolted to the subframe 40.

As illustrated in FIG. 3, extension of the rear end portion 98 of the front undercover 90 covers a front end portion 101B of the middle portion 101 of the middle undercover 100, the front end portion 102A of the right side portion 102 of the middle undercover 100, and the front end portion 103A of the left side portion 103 of the middle undercover 100 and the rear end portion 98 of the front undercover 90 covers each of the front end portions from below the vehicle. A part of the upward extending portion 105 and a part of the forward extending portion 106 constitute the front end portion 101B of the middle portion 101 and the front end portion 101B of the middle portion 101 is divided into a part arranged between the jack hole 120 and the front end portion 102A of the right side portion 102 and a part arranged between the jack hole 120 and the front end portion 103A of the left side portion 103. The front end portion 101B of the middle portion 101, the front end portion 102A of the right side portion 102, and the front end portion 103A of the left side portion 103 constitute a front end portion 100A of the middle undercover 100.

As illustrated in FIG. 5, the peripheral edge portion 91B constituting the first notched hole 91A in the rear end portion 98 of the front undercover 90 is disposed below the forward extending portion 106 as the peripheral edge portion that constitutes the second notched hole 101A in the middle portion 101 of the middle undercover 100. The rear end portion 98 of the front undercover 90 extends to a position close to the main body portion 104 of the middle undercover 100 and covers, from below the vehicle, the dent portion 107 in which the fastening bolt 200 of the forward extending portion 106 is arranged. In other words, the dent portion 107 formed in the forward extending portion 106 is disposed between the subframe 40 and the front undercover 90. Accordingly, the fastening bolt 200 that is arranged in the forward extending portion 106 as one of the fastening bolts 200 that fasten the middle undercover 100 to the subframe 40 is covered by the front undercover 90 from below the vehicle. In other words, the front undercover 90 is an example of a first undercover and the middle undercover 100 is an example of a second undercover. As illustrated in FIG. 5, a recessed groove 96 recessed downward is formed in the peripheral edge portion 91B of the front undercover 90 that constitutes the first notched hole 91A.

Figure 6:
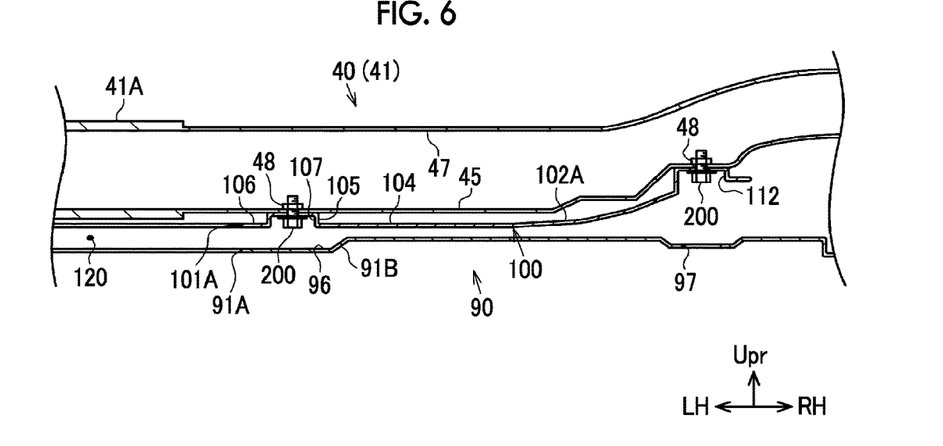
FIG. 6 is a cross-sectional view taken along line VI-VI of FIG. 3.

As illustrated in FIG. 6, the recessed groove 96 extends to a part covering the fastening bolt 200 arranged in the forward extending portion 106 constituting the front end portion 101B of the middle portion 101 in the front undercover 90 from an inner peripheral edge of the peripheral edge portion 91B constituting the first notched hole 91A, that is, a peripheral edge on the first notched hole 91A side. The recessed groove 96 allows the jack hole 120 to communicate with the gap between the rear end portion 98 of the front undercover 90 and the forward extending portion 106 of the middle undercover 100. In the peripheral edge portion 91B constituting the first notched hole 91A, the length between the peripheral edge portion 91B and the forward extending portion 106 in the up-down direction of the vehicle is partially longer because of the recessed groove 96. As illustrated in FIGS. 5 and 6, a depth allowing a tool for the fastening bolt 200 to be disposed between the front undercover 90 and the middle undercover 100 at the part where the recessed groove 96 is formed is set as the depth of the recessed groove 96. Examples of the tool for the fastening bolt 200 include a wrench and a spanner.

The rear end portion 98 of the front undercover 90 extends to a position close to the main body portion 104 of the middle undercover 100 as described above. Accordingly, a distance d1 between the rear end portion 98 of the front undercover 90 and the forward extending portion 106 of the middle undercover 100 in the up-down direction of the vehicle is longer than a distance d2 between the rear end portion 98 of the front undercover 90 and the main body portion 104 of the middle undercover 100 in the front-rear direction of the vehicle as illustrated in FIG. 5 (d1>d2).

As illustrated in FIGS. 3 and 6, through-holes 97 are formed in the rear end portion 98 of the front undercover 90. The through-holes 97 are formed at positions corresponding to the fastening bolts 200 arranged in the front end portion 102A of the right side portion 102 of the middle undercover 100 and the front end portion 103A of the left side portion 103 of the middle undercover 100. Accordingly, the fastening bolts 200 arranged in the front end portion 102A of the right side portion 102 and the front end portion 103A of the left side portion 103 are not covered by the front undercover 90 because of the through-holes 97.

The action and effect of the present embodiment will be described with reference to FIGS. 7 and 8. (1) In the present embodiment, the fastening bolt 200 that is arranged in the forward extending portion 106 as one of the fastening bolts 200 that fasten the middle undercover 100 is covered by the front undercover 90 from below the vehicle. Accordingly, the fastening bolt 200 covered by the front undercover 90 is not exposed downward.

Figure 7:
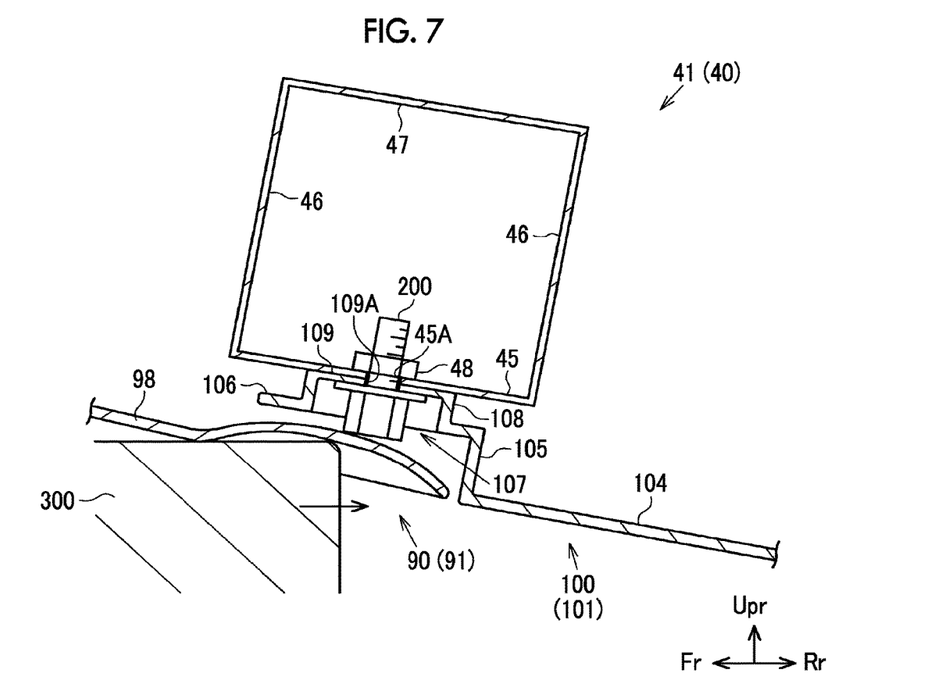
FIG. 7 is a sectional view schematically illustrating a state where a road surface and the front undercover are in contact with each other.

In some cases, the front undercover 90 interferes with a curb 300 on a road surface as illustrated in FIG. 7 once the front tire mounts the curb 300 during traveling of the vehicle. In this case, the front undercover 90 is deformed as a result of the contact with the curb 300. Still, the fastening bolt 200 does not come into contact with the road surface, and thus catching of the fastening bolt 200 by the curb 300 is suppressed. As a result, the fastening reliability of the fastening bolt 200 can be ensured.

(2) The rear end portion 98 of the front undercover 90 covers, from below the vehicle, the fastening bolt 200 that is arranged in the middle portion 101 of the middle undercover 100. In the present embodiment, the driving components such as the internal combustion engine 70 are mounted at the middle part of the vehicle in the width direction of the vehicle. In this case, the middle part of the vehicle is disposed at a position closer to the road surface than both end parts of the vehicle for a mounting space to be ensured for the driving components. In other words, the middle portion 101 disposed at the middle part of the middle undercover 100 in the width direction of the vehicle is disposed below the right side portion 102 and the left side portion 103. In the present embodiment, the fastening bolt 200 fastening the front end portion 101B of the middle portion 101 to the subframe 40 is covered by the front undercover 90. Accordingly, contact between the road surface and the fastening bolt 200 disposed at a part of the lower portion of the vehicle more likely to come into contact with the road surface can be suppressed. Accordingly, the configuration aspect of the front undercover 90 can become appropriate with the fastening reliability of the fastening bolt 200 ensured.

(3) The front undercover 90 and the middle undercover 100 are disposed side by side in the front-rear direction of the vehicle such that the front undercover 90 is positioned on the front side of the vehicle. The fastening bolt 200 fastening the front end portion 100A of the middle undercover 100 disposed on the rear side of the vehicle is configured to be covered, from below the vehicle, by the rear end portion 98 of the front undercover 90 disposed on the front side of the vehicle. Accordingly, the undercover 80 is unlikely to be caught by the road surface during a forward movement of the vehicle.

(4) In the present embodiment, the front undercover 90 is obliquely disposed with respect to the horizontal direction such that the front undercover 90 is positioned to be higher the closer the front undercover 90 is to the front side of the vehicle. Accordingly, the gap between the front undercover 90 and the road surface is wider on the front side of the vehicle. Accordingly, the front undercover 90 is unlikely to come into contact with the road surface. Even if the front undercover 90 comes into contact with the road surface during the forward movement of the vehicle, the boundary part that is shared by the front undercover 90 and the middle undercover 100 is unlikely to be caught by the road surface. This is because the rear end portion 98 of the front undercover 90 covers the front end portion 100A of the middle undercover 100 from below the vehicle. In addition, the turbulence of the air that flows from the front of the vehicle to the rear of the vehicle can be suppressed. Accordingly, a contribution can be made to improve the durability of the undercover 80 and a contribution can be made to suppress an increase in air resistance.

(5) The through-holes 97 are formed in the rear end portion 98 of the front undercover 90 covering the front end portion 100A of the middle undercover 100 from below the vehicle. The through-holes 97 are formed at the positions corresponding to the respective fastening bolts 200 arranged in the front end portion 102A of the right side portion 102 of the middle undercover 100 and the front end portion 103A of the left side portion 103 of the middle undercover 100. In other words, the fastening bolt 200 arranged in the front end portion 101B of the middle portion 101 of the middle undercover 100 is covered by the front undercover 90 from below the vehicle. The respective fastening bolts 200 arranged in the front end portion 102A of the right side portion 102 and the front end portion 103A of the left side portion 103 are not covered by the front undercover 90 because of the through-holes 97 that are formed at the positions in the front undercover 90 corresponding to the respective fastening bolts 200. The right side portion 102 and the left side portion 103 of the middle undercover 100 more distant from the road surface and less likely to come into contact with the road surface than the middle portion 101 of the middle undercover 100 as described above are configured such that the fastening bolts 200 arranged in the respective front end portions 102A, 103A of the right side portion 102 and the left side portion 103 are not covered by the front undercover 90. Accordingly, access to the fastening bolts 200 arranged in the respective front end portions 102A, 103A of the right side portion 102 and the left side portion 103 can be given through the through-holes 97, and the fastening bolts 200 can be assembled with a tool such as a T-wrench through the through-holes 97 even in a state where the front undercover 90 is assembled in the vehicle. As a result, each of the fastening bolts 200 fastening the right side portion 102 and the left side portion 103 of the middle undercover 100 can be removed with ease.

(6) The recessed groove 96 is formed in the front undercover 90 and the recessed groove 96 extends from the peripheral edge portion 91B constituting the jack hole 120 to the front end portion 101B of the middle portion 101 of the middle undercover 100, that is, the part covering the fastening bolt 200 arranged in the forward extending portion 106. The recessed groove 96 allows the jack hole 120 to communicate with the gap between the rear end portion 98 of the front undercover 90 and the forward extending portion 106 of the middle undercover 100. The recessed groove 96 is recessed downward and the distance d1 between the rear end portion 98 of the front undercover 90 and the forward extending portion 106 of the middle undercover 100 in the up-down direction of the vehicle is longer than the distance d2 between the rear end portion 98 of the front undercover 90 and the main body portion 104 of the middle undercover 100 in the front-rear direction of the vehicle.

Figure 8:
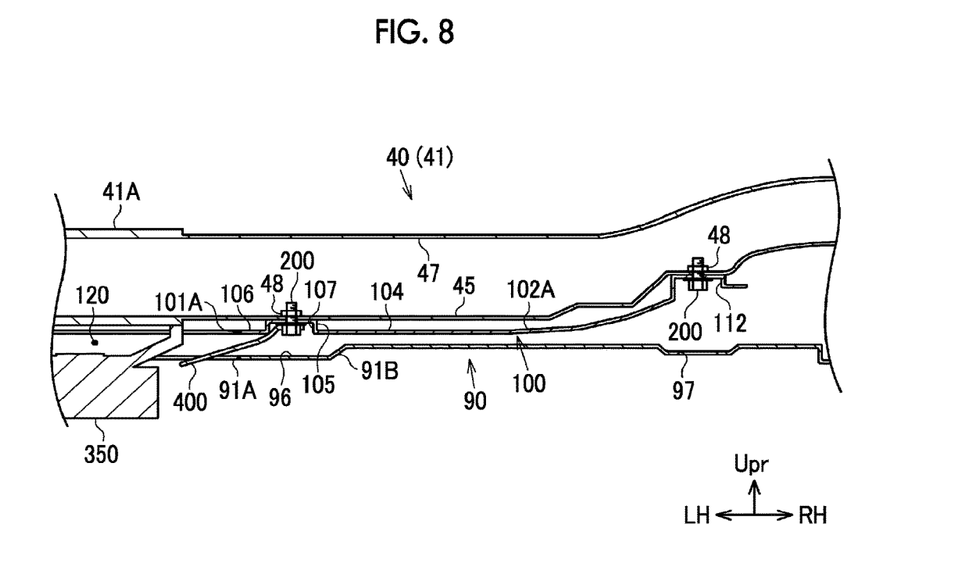
FIG. 8 is a sectional view of the vehicle substructure illustrating a state where a jack is assembled.

During maintenance of the vehicle, a jack 350 is attached to the mounting portion 41A through the jack hole 120 as illustrated in FIG. 8. The front cross member 41 is pushed upward and the vehicle is jacked up by the jack 350. The depth allowing the tool for the fastening bolt 200, such as a wrench and a spanner, to be disposed between the front undercover 90 and the middle undercover 100 at the part where the recessed groove 96 is formed is set as the depth of the recessed groove 96. Accordingly, the fastening bolt 200 arranged in the forward extending portion 106 can be assembled with a wrench 400 by the wrench 400 being inserted from the jack hole 120 in a state where the vehicle is jacked up. Then, the fastening bolt 200 can be removed even in a state where the front undercover 90 and the middle undercover 100 are assembled in the vehicle, that is, even in a state where the fastening bolt 200 fastening the forward extending portion 106 is covered by the front undercover 90. Since the distance d2 between the rear end portion 98 and the main body portion 104 in the front-rear direction of the vehicle is short, the turbulence of the air can be suppressed and the air is allowed to flow smoothly from the front of the vehicle to the rear of the vehicle. Accordingly, the middle undercover 100 can be removed with the front undercover 90 assembled in the vehicle. As a result, a contribution can be made to improve the maintainability of the vehicle and a contribution can be made to suppress an increase in air resistance.

(7) The bolt holes 45A formed in the front cross member 41 are disposed in front of the bolt holes 22A formed in the second mounting flanges 22 of the wheelhouses 20. Accordingly, even in a case where a configuration is adopted in which the part of the rear end portion 98 of the front undercover 90 that is arranged between the fastening flanges 95 and covers the front end portion 100A of the middle undercover 100 is not connected to the vehicle by a bolt, both end portions of the part can be bolted at positions on the side that is closer to the rear of the vehicle. Accordingly, the fastening reliability of the front undercover 90 can be ensured.

The above-described embodiment can be modified as follows. In the vehicle, the bolt hole 45A formed in the front cross member 41 may be disposed behind the bolt hole 22A formed in the second mounting flange 22 of the wheelhouse 20 or may be disposed at the same position in the front-rear direction of the vehicle as the bolt hole 22A formed in the second mounting flange 22.

The distance d1 between the rear end portion 98 of the front undercover 90 and the forward extending portion 106 of the middle undercover 100 in the up-down direction of the vehicle may not be longer than the distance d2 between the rear end portion 98 of the front undercover 90 and the main body portion 104 of the middle undercover 100 in the front-rear direction of the vehicle. In other words, the distance d1 may be shorter than the distance d2 (d1<d2) or may be equal to the distance d2 (d1=d2). Desirably, a distance allowing the tool for the fastening bolt 200 to be inserted through the jack hole 120 into the gap between the rear end portion 98 of the front undercover 90 and the forward extending portion 106 of the middle undercover 100 is set as the distance d1 between the rear end portion 98 of the front undercover 90 and the forward extending portion 106 of the middle undercover 100 in the up-down direction of the vehicle.

The jack hole 120 is optional and can be omitted. In other words, an alternative configuration may be adopted that is not provided with the first notched hole 91A of the front undercover 90 and the second notched hole 101A of the middle undercover 100.

Figure 9:
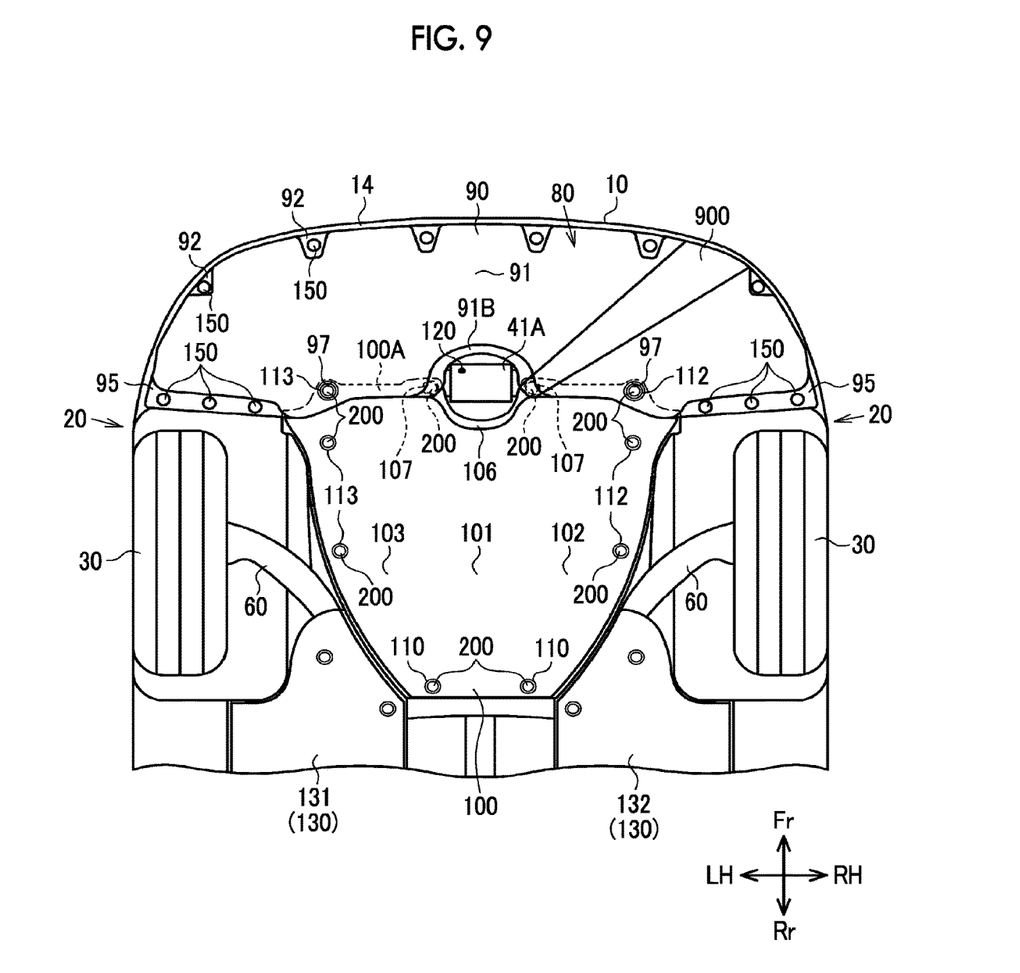
FIG. 9 is a bottom view illustrating a modification example of an aspect of arrangement of a recessed groove disposed in the front undercover.

The aspect of setting of the recessed groove is not limited to that according to the above-described embodiment. For example, the front undercover 90 may be provided with a recessed groove 900 extending from the peripheral edge on the front side of the vehicle to the part that covers the fastening bolt 200 arranged in the forward extending portion 106 of the middle undercover 100 as illustrated in FIG. 9. Even in this case, the recessed groove 900 is recessed downward and a depth allowing the tool for the fastening bolt 200 to be disposed between the front undercover 90 and the middle undercover 100 is set as the depth of the recessed groove 900. When the recessed groove 900 is seen from below the vehicle, the recessed groove 900 has the shape of a fan wider on the peripheral edge side. This is to allow a pivoting operation of the tool with which the fastening bolt 200 is assembled. The above-described configuration also allows the fastening bolt 200 arranged in the forward extending portion 106 to be removed by insertion of the tool into the recessed groove 900. The recessed grooves 96, 900 may be omitted as well.

In the rear end portion 98 of the front undercover 90, the through-holes 97 are formed at the positions corresponding to the respective fastening bolts 200 arranged in the front end portion 102A of the right side portion 102 of the middle undercover 100 and the front end portion 103A of the left side portion 103 of the middle undercover 100. The aspect of arrangement of the through-holes 97 is not limited thereto. For example, the through-hole 97 may be formed merely at the position corresponding to the fastening bolt 200 arranged in one of the front end portion 102A of the right side portion 102 and the front end portion 103A of the left side portion 103. In some cases, in addition, both of the end parts of the vehicle in the width direction of the vehicle are more likely to come into contact with the road surface than the middle part of the vehicle in the width direction of the vehicle. In this case, a configuration may be adopted in which the through-hole 97 is formed at the position corresponding to the fastening bolt 200 arranged in the front end portion 101B of the middle portion 101 of the middle undercover 100 and the through-holes 97 are not formed at the positions corresponding to the respective fastening bolts 200 arranged in the front end portion 103A of the left side portion 103 of the middle undercover 100 and the front end portion 102A of the right side portion 102 of the middle undercover 100. In this case, a recessed groove can be disposed that extends from the peripheral edge of the front undercover 90 to the parts that cover the fastening bolts 200 arranged in the front end portion 103A of the left side portion 103 of the middle undercover 100 and the front end portion 102A of the right side portion 102 of the middle undercover 100. A configuration in which the through-hole 97 is not formed in the front undercover 90 can also be adopted.

The front undercover 90 may not be obliquely disposed with respect to the horizontal direction such that the front undercover 90 is positioned to be higher the closer the front undercover 90 is to the front side of the vehicle. In other words, the front undercover 90 may extend in parallel to the horizontal direction or may be obliquely disposed with respect to the horizontal direction such that the front undercover 90 is positioned to be lower the closer the front undercover 90 is to the front side of the vehicle.

In the above-described configuration, extension of the rear end portion 98 of the front undercover 90 covers the front end portion 101B of the middle portion 101 of the middle undercover 100, the front end portion 102A of the right side portion 102 of the middle undercover 100, and the front end portion 103A of the left side portion 103 of the middle undercover 100 and the rear end portion 98 of the front undercover 90 covers each of the front end portions from below the vehicle. In an alternative configuration, the rear end portion 98 of the front undercover 90 may cover, from below the vehicle, at least one of the front end portion 101B of the middle portion 101 of the middle undercover 100, the front end portion 102A of the right side portion 102 of the middle undercover 100, and the front end portion 103A of the left side portion 103 of the middle undercover 100. The point is that the rear end portion 98 of the front undercover 90 may be capable of covering, from below the vehicle, the fastening bolt 200 fastening the middle undercover 100.

An example in which the middle portion 101 is disposed below the right side portion 102 and the left side portion 103 in the middle undercover 100 has been described above. However, the above-described configuration can be appropriately changed. For example, the middle portion 101 may be disposed above at least one of the right side portion 102 and the left side portion 103 or may be disposed at the same position in the up-down direction of the vehicle as at least one of the right side portion 102 and the left side portion 103.

According to the configuration of the embodiment that has been described above, the rear end portion 98 is a site in the front undercover 90 that is adjacent to the middle undercover 100 and the middle undercover 100 is covered by the rear end portion 98. Depending on the shape of the front undercover 90, however, the middle undercover 100 can also be covered from below the vehicle by a part other than the rear end portion 98. For example, a configuration may also be adopted in which a coating member extending downward from the side peripheral edge of the front undercover 90 is disposed and the front end portion 100A is covered from below the vehicle by the coating member being disposed below the front end portion 100A of the middle undercover 100.

In an alternative configuration, the bolt 150 fastening the rear undercover 130 to the subframe 40 may be covered from below the vehicle with the rear end portion of the middle undercover 100 disposed below the front end portion 131A of the rear undercover 130. In this case, the middle undercover 100 corresponds to the second undercover in its relationship with the front undercover 90 and corresponds to the first undercover in its relationship with the rear undercover 130. In addition, the rear undercover 130 corresponds to the second undercover.

In the configuration described above, the fastening bolt 200 fastening the middle undercover 100 is covered from below the vehicle by the rear end portion 98 of the front undercover 90 disposed on the front side of the vehicle being disposed below the front end portion 100A of the middle undercover 100 disposed on the rear side of the vehicle. In an alternative configuration, the bolt 150 fastening the front undercover 90 to the wheelhouse 20 may be covered from below the vehicle by the front end portion 100A by the front end portion 100A of the middle undercover 100 disposed on the rear side of the vehicle being disposed below the rear end portion 98 of the front undercover 90 disposed on the front side of the vehicle. In this case, the middle undercover 100 corresponds to the first undercover and the front undercover 90 corresponds to the second undercover.

The configuration of the undercover 80 is not limited to that according to the embodiment described above. For example, the undercover 80 may be provided with the first and second undercovers that are disposed side by side in the width direction of the vehicle. For example, the right end portion of the first undercover is disposed below the left end portion of the second undercover in a case where the first undercover is disposed on the left side in the width direction of the vehicle and the second undercover is disposed on the right side in the width direction of the vehicle. A configuration in which the fastening bolt 200 fastening the second undercover to the skeleton member of the vehicle is covered from below the vehicle may be adopted as a result.

In an alternative configuration, the first undercover may cover all of the fastening bolts of the second undercover with the first undercover and the second undercover disposed side by side with each other. In a configuration in which the fastening bolt is arranged at the peripheral edge part of the second undercover, for example, an extending portion that has the same shape as the outer shape of the second undercover is disposed on the first undercover and the central part of the extending portion is hollowed out. In the configuration described above, the extending portion is disposed such that the extending portion overlaps with the second undercover below the second undercover. As a result, the middle part of the second undercover is exposed downward and the peripheral edge part of the second undercover is covered from below the vehicle by the extending portion of the first undercover.

The subframe 40 has been described as an example of the skeleton member to which the second undercover is fastened. However, the skeleton member is not limited to the subframe 40. For example, the front side member 55, the wheelhouse 20, and the like can also be adopted as the skeleton member.

The vehicle substructure in the front end portion of the vehicle has been described as an example of the vehicle substructure. However, configurations similar to that of the embodiment can also be adopted for a vehicle substructure in the rear end portion of the vehicle and a vehicle substructure in the middle portion of the vehicle.

What is claimed is:

1. A vehicle substructure comprising:
    a first undercover disposed in a lower portion of a vehicle; and
    a second undercover disposed side by side with the first undercover in the lower portion of the vehicle,
    wherein the second undercover is fastened to a skeleton member of the vehicle via a fastening bolt inserted into a bolt hole provided in the second undercover, and
    a part of the first undercover is disposed below the second undercover to cover the fastening bolt fastening the second undercover from below the vehicle.

2. The vehicle substructure according to claim 1, wherein:
    the second undercover includes a middle portion disposed at a middle part of the vehicle in a width direction of the vehicle and a side portion extending outward in the width direction of the vehicle from the middle portion; and
    the middle portion is disposed below the side portion, and the fastening bolt covered from below the vehicle by the part of the first undercover is arranged in the middle portion.

3. The vehicle substructure according to claim 2, wherein the first undercover and the second undercover are disposed side by side in a front-rear direction of the vehicle such that the first undercover is positioned in front of the second undercover.

4. The vehicle substructure according to claim 3, wherein:
    the first undercover is obliquely disposed with respect to a horizontal direction such that the first undercover is positioned to be higher the closer the first undercover is to a front side of the vehicle; and
    a rear end portion of the first undercover extends to be arranged below a front end portion of the middle portion of the second undercover and a front end portion of the side portion of the second undercover so as to cover each of the front end portions of the second undercover from below the vehicle.

5. The vehicle substructure according to claim 4, wherein a through-hole is provided at a position in the rear end portion of the first undercover, the position corresponding to the fastening bolt arranged in the front end portion of the side portion.

6. The vehicle substructure according to claim 5, wherein:
    the first undercover has a recessed groove, the recessed groove extending from a peripheral edge of the first undercover to the part of the first undercover, which covers the fastening bolt arranged in the front end portion of the middle portion and the recessed groove being recessed downward; and
    the recessed groove has a depth allowing a tool for the fastening bolt to be disposed between the first undercover and the second undercover.

* * * * *